US010365657B2

(12) United States Patent
Tokuyama et al.

(10) Patent No.: US 10,365,657 B2
(45) Date of Patent: Jul. 30, 2019

(54) AUTONOMOUS MOVING OBJECT (71) Applicant: HITACHI, LTD., Tokyo (JP)

(72) Inventors: Mikio Tokuyama, Tokyo (JP); Kenjiro Yamamoto, Tokyo (JP); Taiki Iimura, Tokyo (JP); Azusa Amino, Tokyo (JP)

(73) Assignee: HITACHI, LTD., Tokyo (JP)

( * ) Notice: Subject to any disclaimer, the term of this patent is extended or adjusted under 35 U.S.C. 154(b) by 130 days.

(21) Appl. No.: 15/300,982

(22) PCT Filed: Apr. 3, 2014

(86) PCT No.: PCT/JP2014/059891
§ 371 (c)(1),
(2) Date: Sep. 30, 2016

(87) PCT Pub. No.: WO2015/151266
PCT Pub. Date: Oct. 8, 2015

(65) Prior Publication Data
US 2017/0017237 A1    Jan. 19, 2017

(51) Int. Cl.
*G05D 1/02*    (2006.01)
(52) U.S. Cl.
CPC .......... *G05D 1/0246* (2013.01); *G05D 1/024* (2013.01); *G05D 2201/0213* (2013.01)
(58) Field of Classification Search
CPC ............... G05D 1/0246; G05D 1/024; G05D 2201/0213
See application file for complete search history.

(56) References Cited

U.S. PATENT DOCUMENTS

2014/0095009 A1    4/2014 Oshima et al.

FOREIGN PATENT DOCUMENTS

| JP | 5-165523 A | | 7/1993 |
|----|-----------|---|--------|
| JP | H05165523 | * | 7/1993 |
| JP | 9-204222 A | | 8/1997 |
| JP | 2002-150475 A | | 5/2002 |
| JP | 2005-351877 A | | 12/2005 |
| JP | 2006-139707 A | | 6/2006 |

(Continued)

OTHER PUBLICATIONS

Specktor, Brandon; This is Why Japan has Blue Traffic Lights Instead of Green, Printed Mar. 27, 2018 (Year: 2018).*

(Continued)

*Primary Examiner* — Alan D Hutchinson
(74) *Attorney, Agent, or Firm* — Volpe and Koenig, P.C.

(57) ABSTRACT

An environment information acquisition unit acquires a signal state of a traffic light. A self-position estimation unit estimates a self-position of the autonomous moving object. A traveling route decision unit calculates a first time necessary to move along a first route from the self-position to an end point of a crosswalk and a second time necessary to move along a second route from the self-point to a start point of the crosswalk in a case in which the signal state is changed from blue to red on the crosswalk after a predetermined time or in a case in which the signal state is changed from blue to red, and selects a route corresponding to a time smaller between the first time and the second time. A vehicle control unit controls autonomous movement of the autonomous moving object so that the autonomous moving object moves along the selected route.

7 Claims, 8 Drawing Sheets (56) References Cited

FOREIGN PATENT DOCUMENTS

| JP | 2008-282073 | A |   | 11/2008 |
| JP | 2008282073  | A | * | 11/2008 |
| JP | 2013186051  | A | * | 9/2013  |
| WO | 2012/164691 | A |   | 6/2012  |

OTHER PUBLICATIONS

Machine Translation of JP 2013-186051, Printed Mar. 28, 2018 (Year: 2018).*
Machine Translation of JP H05-165523, Printed Mar. 28, 2018 (Year: 2018).*
ONCOR; Sign Flashcards, Apr. 12, 2008 (Year: 2008).*
Machine Translation of JP 2008-282073, Printed Mar. 27, 2018 (Year: 2018).*
City of Redmond Washington; Pedestrian Countdown Signals; Oct. 31, 2013 (Year: 2013).*
Land Transport NZ; Pedestrian planning and design guide. chapter 15 Crossings; Apr. 8, 2008 (Year: 2008).*
Translation of Akahane, A Reconsideration: Pedestrian Crossings, Translated Apr. 2018, Original 2006 (Year: 2006).*
Hirokazu Akahane, "Saiko-Hokosha no Odan-", Kotsu Kogaku, 2006, vol. 41, No. 2, pp. 7 to 9 ("Reconsidering pedestrian crossings", Japan Society of Traffic Engineers, 2006, vol. 41, No. 2, pp. 7 to 9, with English language concise explanation of relevance provided by International Search Report and Written Opinion of the International Searching Authority for corresponding PCT Application No. PCT/JP2014/059891, dated May 20, 2014).
International Search Report and Written Opinion of the International Searching Authority for corresponding PCT Application No. PCT/JP2014/059891, dated May 20, 2014.

\* cited by examiner

| ROUTE Pi | $P_1$ | $P_2$ | $P_3$ |
|---|---|---|---|
| CROSSING TIME Ti | T1 | T2 | T3 |
| DEGREE OF RISK Ri (NUMBER OF APPROACHES TO OBSTACLES) | 1(ONCE) | 2(TWICE) | 1(ONCE) |

[Fig. 7]

| ROUTE Qj | $Q_1$ | $Q_2$ |
|---|---|---|
| RETURNING TIME Tj | T1 | T2 |
| DEGREE OF RISK Rj (NUMBER OF APPROACHES TO OBSTACLES) | 0(0 TIMES) | 0(0 TIMES) |

| ROUTE | $P_1$ | $P_2$ | $P_3$ |
|---|---|---|---|
| CROSSING ROUTE LENGTH Pi | 2L+L1 | 2L+L2 | — |
| CROSSING TIME Ti | T1 | T2 | — |
| DEGREE OF RISK Ri (NUMBER OF APPROACHES TO OBSTACLES) | 2(TWICE) | 3(3 TIMES) | — |
| SPECIAL NOTE | | | OUTSIDE OF CROSSWALK |

AUTONOMOUS MOVING OBJECT

TECHNICAL FIELD

The present invention relates to an autonomous moving object.

BACKGROUND ART

An apparatus that detects a direction in which an active tag is located in regard to crossing of an autonomous moving object at a crosswalk and a distance between the active tag and a portable terminal with high precision and supports autonomous movement of a pedestrian, a robot, or the like has been disclosed (for example, see PTL 1).

PTL 1 discloses that a change in a timing, an amplitude, a frequency, a phase, or a combination of the timing, the amplitude, the frequency, and the phase of a high frequency signal received at the time of switch of a directivity antenna is measured in real time while an active tag 1 transmits the high frequency signal toward a directivity antenna of a portable terminal to be opposite in the direction of a directivity antenna of an active tag, and a direction in which the active tag is located and a distance between the active tag and the portable terminal are detected, so that a pedestrian can safely walks without deviating from the range of a crosswalk.

An autonomous moving system of an autonomous moving object which autonomously travels along a standard route designated on a map while estimating the position of the autonomous moving object in regard to narrow road passing of the autonomous moving object (for example, see PTL 2). The object of the invention disclosed in PTL 2 is to provide an autonomous moving system capable of passing a narrow road safely and quickly by independently performing a plan for a path in which a pass width of an autonomous moving object varies and a plan for a speed in which braking conditions of an own car and movement of obstacles are considered.

PTL 2 discloses an autonomous moving system that includes environment information acquisition means for acquiring environment information regarding the circumference of an autonomous moving object, stored information processing means for retaining map information in which a standard route is registered, self-position estimation means for estimating a self-position of the autonomous moving object based on the environment information and the map information, obstacle detection means for detecting information regarding obstacles based on the environment information, route decision means for deciding a movement direction based on the self-position, the information regarding the obstacles, and information regarding the standard route, speed decision means for deciding a movement speed based on the information regarding the obstacles, and vehicle control means for controlling movement of the autonomous moving object based on the movement direction and the movement speed. The route decision means calculates a passing region which has a predetermined pass width or more in a plurality of movement directions and is formed by a pass width and a pass distance in which there is no invasion of an obstacle and decides a movement direction of the autonomous moving object based on a tracking movement direction and the passing region in order to avoid the obstacle present in the tracking movement direction for tracking from a current position of the autonomous moving object to the standard route. The speed decision means decides a movement speed at which the autonomous moving object can stop before collision with the obstacle according to the braking conditions of the autonomous moving object and the position and speed of the obstacle.

CITATION LIST

Patent Literature

PTL 1: JP-A-2005-351877
PTL 2: WO2012/164691

SUMMARY OF INVENTION

Technical Problem

For an autonomous moving object which autonomously travels along a standard route designated on a map while estimating a self-position, particularly, for an autonomous moving object which autonomously moves on a sidewalk, it is essential to cross a crosswalk safely in order to arrive at a destination. In the related art, it was not examined that an autonomous moving object moving on a sidewalk crosses a crosswalk safely and quickly.

Specifically, it was not examined that, for example, when a blue signal of a traffic light is blinking or is changed to a red signal during crossing of an autonomous moving object at a crosswalk, it is better for the autonomous moving object (1) to continuously cross the crosswalk and finish the crossing or it is better for the autonomous moving object (2) to stop crossing and return to a start point of the crosswalk, that is, which is selected between (1) and (2) in order to cross the crosswalk safely and quickly. Actually, neither PTL 1 nor PTL 2 discloses which is selected between (1) or (2) in a case in which a signal of a traffic light is changed while an autonomous moving object is crossing a crosswalk and discloses any indication.

For this reason, an autonomous moving object may not cross a crosswalk safely and quickly. In particular, since a person gets in an autonomous moving object which travels up to a destination, it is essential to cross a crosswalk safely and quickly.

A movement route up to a destination can be generated without using crosswalks in some cases. However, a route may be detoured or an autonomous moving object may not reach a destination without crossing crosswalks in some cases. Thus, it is essential to cross a crosswalk safely and quickly.

An object of the invention is to provide an autonomous moving object capable of crossing a crosswalk safely and quickly.

Solution to Problem

In order to achieve the object, the invention provides an autonomous moving object including: an environment information acquisition unit that acquires a signal state of a traffic light; a self-position estimation unit that estimates a self-position of the autonomous moving object; a traveling route decision unit that calculates a first time necessary to move along a first route from the self-position to an end point of a crosswalk and a second time necessary to move along a second route from the self-point to a start point of the crosswalk in a case in which the signal state is changed from blue to red on the crosswalk after a predetermined time or in a case in which the signal state is changed from blue to red, and selects a route corresponding to a time smaller between the first time and the second time; and a vehicle control unit that controls autonomous movement of the autonomous moving object so that the autonomous moving object moves along the selected route.

Advantageous Effects of Invention

According to the invention, an autonomous moving object can cross a crosswalk safely and quickly. Other tasks, configuration, and advantageous effects are apparent in the description of the following embodiments.

DESCRIPTION OF EMBODIMENTS

Hereinafter, configurations and operations of an autonomous moving object according to first to third embodiments of the invention will be described with reference to the drawings. In the drawings, same reference numerals indicate same elements.

(First Embodiment)

Figure 1:
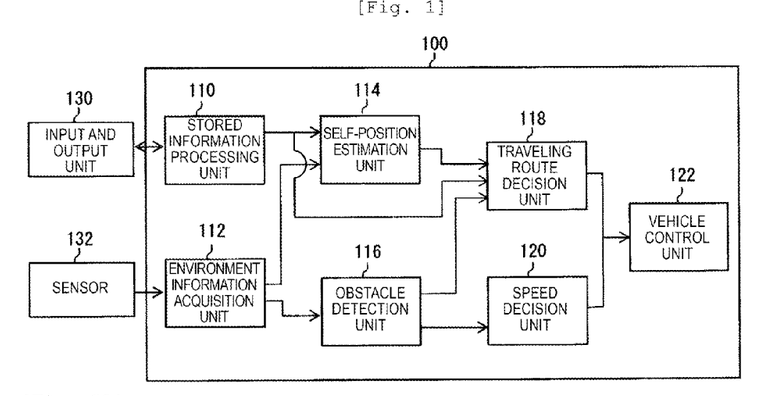
FIG. 1 is a block diagram illustrating the configuration of an autonomous moving object according to a first embodiment of the invention.

First, the first embodiment will be described with reference to FIGS. 1 to 4. FIG. 1 is a block diagram illustrating the configuration of an autonomous moving object 100 according to the first embodiment of the invention.

As illustrated in FIG. 1, the autonomous moving object 100 includes a stored information processing unit 110, an environment information acquisition unit 112, a self-position estimation unit 114, an obstacle detection unit 116, a traveling route decision unit 118, a speed decision unit 120, and a vehicle control unit 122.

The autonomous moving object according to the embodiment is configured to include, for example, four wheels and move with the wheels.

The stored information processing unit 110 retains (stores) at least a route (standard route) serving as a standard by which the autonomous moving object 100 travels and landmarks (mark information obtained from the shapes of buildings or trees, images and magnetism, and road shapes) present in the surroundings of the route. The stored information processing unit 110 transmits information regarding the landmarks of the surroundings of the route to the self-position estimation unit 114 and transmits information (route information) of a route serving as a standard to the traveling route decision unit 118.

Here, in the route information, the positions of crosswalks and traffic lights, the lengths or widths of the crosswalks, and blinking times of the traffic lights are recorded. That is, the stored information processing unit 110 stores positional information indicating the positions of the crosswalks and the traffic lights, shape information indicating the shapes of the crosswalks, and the blinking times of the traffic lights.

An input and output unit 130 inputs information such as the route information, the landmarks, the crosswalks, and the traffic lights described above to the stored information processing unit 110 and outputs various kinds of information stored in the stored information processing unit 110.

The environment information acquisition unit 112 illustrated in FIG. 1 acquires information from a sensor 132 mounted on autonomous moving object 100. Although the details of the sensor are not illustrated, a laser type distance sensor, a camera, an angular velocity sensor, an acceleration sensor, a geomagnetic sensor, a GPS receiver, a wheel encoder, and the like are used.

The self-position estimation unit 114 specifies a current position of the autonomous moving object 100 based on the information acquired from each sensor. Specifically, the self-position estimation unit 114 estimates an accurate self-position and an accurate self-direction within a region in which the autonomous moving object 100 moves, for example, by stochastically merging self-position information (wheel odometry) generated by accumulating values of the wheel encoder, gyro odometry by the angular velocity sensor, the acceleration sensor, and the geomagnetic sensor, self-position information (self-position by map matching) obtained by matching information by the laser distance sensor or the camera with the above-described landmark information obtained from the stored information processing unit 110, and self-position information obtained from the GPS receiver (for example, adopting a scheme called an extended Kalman filter). The self-position estimation unit 114 transmits the finally obtained self-position to the obstacle detection unit 116 and the traveling route decision unit 118 to be described below.

The obstacle detection unit 116 detects regions which are likely to be obstacles to movement of the autonomous moving object 100 based on the above-described sensor information. Here, based on surrounding shape information obtained from, for example, a laser type distance sensor or a camera (a stereo camera or the like capable of measuring a distance), the obstacle detection unit 116 detects step differences in heights at which the autonomous moving object 100 is not able to travel over, large furrows, and obstacles such as aerial projection objects.

The obstacle detection unit 116 also detects moving obstacles such as pedestrians and bicycles present in environments such as facilities and downtowns which are targets of the autonomous moving object 100 according to the embodiment. The camera is also used to detect colors or blinking states of signals of traffic lights of crosswalks. Here, the environment information acquisition unit 112 acquires a signal state of a traffic light based on a signal output from the camera.

The traveling route decision unit 118 decides a target direction of the autonomous moving object 100 based on the above-described self-position information, a traveling standard route, and obstacle information such as kinds of obstacles (pedestrians, bicycles, unmoving objects, step differences, and the like) and positions, shapes, and the like of obstacles detected by the obstacle detection unit 116. That is, the traveling route decision unit 118 selects a route to avoid the obstacles. The traveling route decision unit 118 decides a movement direction in consideration of tracking to the standard route, avoidance of obstacles, and safety of passing positions in an order to be described below and transmits the movement direction to the vehicle control unit 122.

The speed decision unit 120 decides and switches a traveling speed of the autonomous moving object 100 depending on a normal traveling mode or a crosswalk traveling mode. In the crosswalk traveling mode, when a blue signal of a traffic light is blinking or is changed to a red signal, a traveling speed of the autonomous moving object 100 is increased or the traveling speed is decided according to speeds of surrounding obstacle objects.

The vehicle control unit 122 performs vehicle motion control using the target direction and the target speed of the autonomous moving object 100 respectively acquired from the traveling route decision unit 118 and the speed decision unit 120. Specifically, for example, the control is performed such that a difference between a current movement direction and a current movement speed of the autonomous moving object 100 and the target direction and the target speed is small. The vehicle control unit 122 includes a motor or an electronic circuit to control the wheels so that the position or the direction of the autonomous moving object 100 can be changed.

In this way, the vehicle control unit 122 controls autonomous movement of the autonomous moving object 100 so that the autonomous moving object 100 moves along the route selected by the traveling route decision unit 118 at the speed decided by the speed decision unit 120.

Figure 2A:
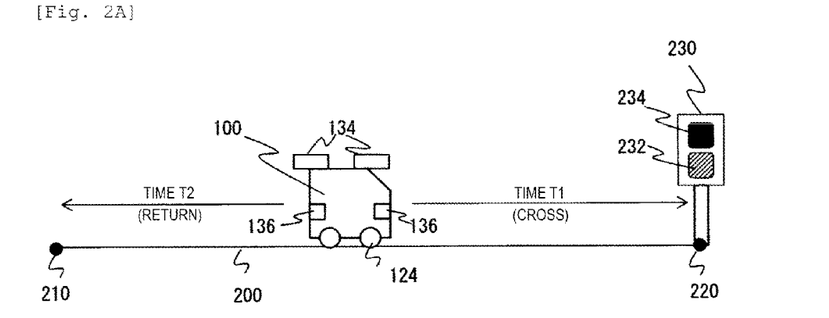
FIG. 2A is a conceptual diagram (front view) illustrating a traveling state of the autonomous moving object according to the first embodiment of the invention.
Figure 2B:
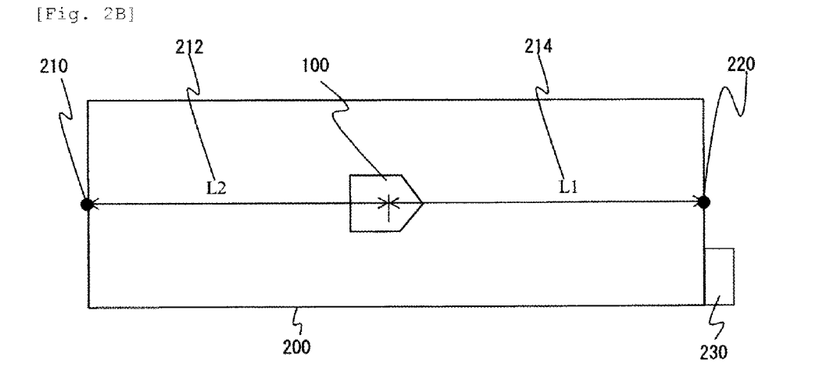
FIG. 2B is a conceptual diagram (plan view) illustrating a traveling state of the autonomous moving object according the first embodiment of the invention.

FIG. 2 is a conceptual diagram illustrating a traveling state of the autonomous moving object 100 at a crosswalk 200. FIG. 2A is a front view and FIG. 2B is a plan view.

In FIG. 2, the autonomous moving object 100 is traveling on a crosswalk 200 from a standard route point (a start point of the crosswalk) 210 stored in the stored information processing unit 110 to a standard route point 220 (an end point of the crosswalk 200) stored in the stored information processing unit 110.

Cameras 134, laser distance sensors 136, and a GPS (not illustrated) are mounted as sensors on the autonomous moving object 100. In the embodiment, the autonomous moving object 100 is moving forward with wheels 124. The cameras 134 and the laser distance sensors 136 are installed on the front and rear sides of the autonomous moving object 100 in order to simultaneously observe forward and backward.

Since the cameras 134 are mounted on upper portions of the autonomous moving object 100, the cameras 134 can observe not only obstacles on the rear side of front obstacles but also distant obstacles.

A traffic light 230 is installed on the side of the standard route point 220 which is the end point of the crosswalk 200. In FIG. 2, for example, a blue signal 232 is blinking in the traffic signal 230. The autonomous moving object 100 confirms that the traffic signal 230 is the blue signal 232 with the camera 134 installed in the autonomous moving object 100 at the start point (the standard route point 210) of the crosswalk 200, and is moving toward the endpoint (the standard route point 220) of the crosswalk 200.

In FIG. 2 illustrates a case in which an obstacle such as a person or a bicycle is not present on the crosswalk 200 and only the autonomous moving object 100 is present. When there is no obstacle, the autonomous moving object 100 selects a straight route connecting standard routes (points) and moves. Therefore, as illustrated in FIG. 2B, the autonomous moving object 100 is traveling on a straight route connecting the standard rout point 210 (the start point of the crosswalk) and the standard route point 220 (the end point of the crosswalk). Here, the autonomous moving object 100 is traveling at a position at which a distance from the standard route point 210 to the autonomous moving object 100 is L2 (212) and a distance from the autonomous moving object 100 to the standard route point 220 is L1 (214).

Figure 3:
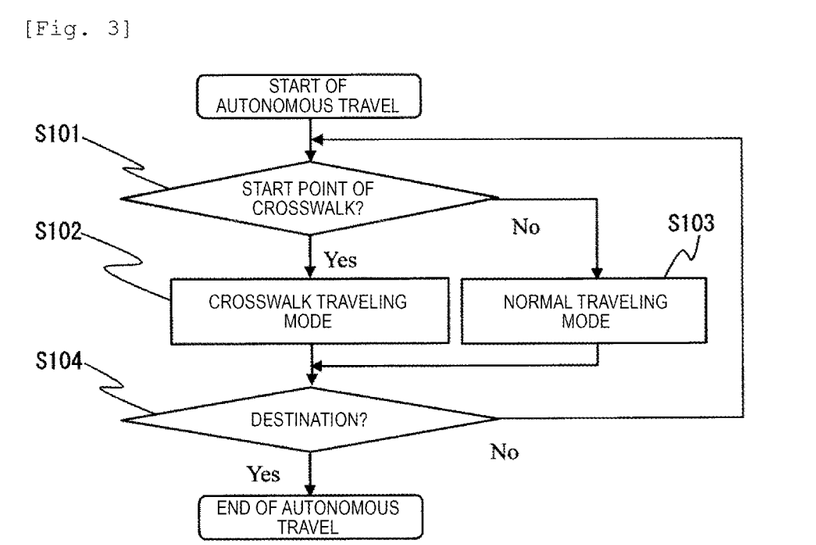
FIG. 3 is a flowchart illustrating a process in which the autonomous moving object switches a mode between a crosswalk traveling mode and a normal traveling mode according to the first embodiment of the invention.
Figure 4:
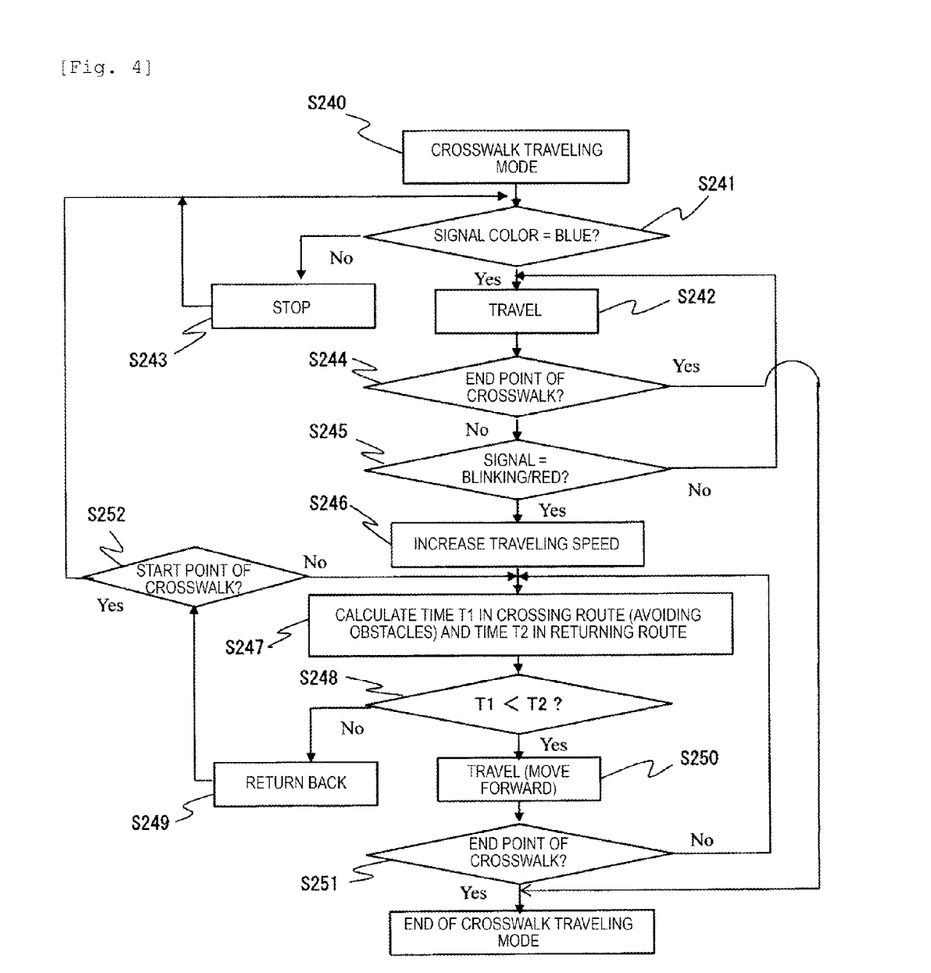
FIG. 4 is a flowchart illustrating a process for the crosswalk traveling mode performed by the autonomous moving object according to the first embodiment of the invention.

FIGS. 3 and 4 are flowcharts illustrating processes of crossing the crosswalk 200. FIG. 3 is a flowchart illustrating a process in which the autonomous moving object 100 switches a mode between a crosswalk traveling mode and a normal traveling mode according to the first embodiment of the invention. FIG. 4 is a flowchart illustrating a process for the crosswalk traveling mode performed by the autonomous moving object 100 according to the first embodiment of the invention.

As described above, the autonomous moving object 100 traces standard route points up to a destination recorded in the above-described stored information processing unit 110 and moves toward the destination stored in the above-described stored information processing unit 110 along a sidewalk of the route decided by the traveling route decision unit 118 while estimating the self-position by the self-position estimation unit 114 based on the information obtained by the environment information acquisition unit 112 and avoiding the obstacles detected by the obstacle detection unit 116.

Here, the autonomous moving object 100 acquires positional information regarding the self-position from the self-position estimation unit 114 and acquires positional information regarding the standard route point 210 which is the start point of the crosswalk from the stored information processing unit 110.

Based on the acquired positional information, the autonomous moving object 100 determines whether the self-position is identical to the standard route point 210 (the start point of the crosswalk) (S101). When the autonomous moving object 100 determines that the self-position is identical to the standard route point 210 (the start point of the crosswalk) (Yes in S101), the autonomous moving object 100 switches a driving mode from the normal traveling mode (S103) to the crosswalk traveling mode (S102).

Then, the autonomous moving object 100 autonomously moves up to the destination (S104) while switching between the normal traveling mode (S103) on a sidewalk and the crosswalk traveling mode (S102) on a crosswalk. Here, in the normal traveling mode, the autonomous moving object 100 may autonomously move (avoid obstacles) and travel in accordance with any method (an order or an algorithm).

FIG. 4 illustrates algorithm of the crosswalk 200 in the crosswalk traveling mode. In the crosswalk traveling mode (S240), as illustrated in FIG. 2A, the autonomous moving object 100 reads a signal (blinking state) of the traffic signal 230 with the camera 134 at the standard route point 210 and determines whether the blue signal is blinking (step S241).

When the blue signal 232 is blinking (S241), the autonomous moving object 100 starts traveling (S242) and starts crossing the crosswalk. Then, when the blue signal is blinking or the blue signal is changed to red during the crossing of the crosswalk (S245), the autonomous moving object 100 causes the speed decision unit 120 to increase the traveling speed (S246). The increased traveling speed is a predetermined speed faster than a traveling speed in the normal traveling mode.

By increasing the traveling speed, it is possible to shorten a crossing travel time. Accordingly, it is possible to finish the crossing quickly. Therefore, it is possible to shorten a staying time on the crosswalk 200, it is possible to reduce a risk ratio, and thus it is possible to cross in addition to safety.

The autonomous moving object 100 calculates a time T1 in a case in which the crossing is finished at the increased speed by a distance L1 from a position of the autonomous moving object 100 at the time of the changing of the traffic light to the end point 220 of the crosswalk and calculates a time in which the autonomous moving object 100 returns to the start point 210 of the crosswalk by a distance L2 (S247). Then, the autonomous moving object 100 selects a route in which a time is shorter between T1 and T2 (S248, S249, and S250). That is, when T1 is shorter than T2, the autonomous moving object 100 travels (moves forward) (S250). When T1 is longer than T2, the autonomous moving object 100 returns back (S249).

Since there is no obstacle in FIG. 2, a magnitude relation between T1 and T2 is decided with the length of the distance L1 (214) in which the autonomous moving object 100 finishes crossing the crosswalk and the length of the distance L2 (212) in which the autonomous moving object 100 returns back, and the magnitude relation is not changed.

However, in a case in which an obstacle such as a pedestrian or a bicycle is moving toward the autonomous moving object 100 from the end point 220 of the crosswalk 200, the time T1 taken to cross the crosswalk while avoiding an obstacle and the time T2 taken to return are changed every moment depending on a situation of an obstacle. Therefore, until the autonomous moving object 100 finishes crossing the crosswalk 200 (No->Yes in S251) or until the autonomous moving object 100 returns back (No->Yes in S252), the autonomous moving object 100 repeatedly calculates the times T1 and T2 (S247) and selects a route in which the shorter time is taken (S248).

Thus, since it is possible to furthest shorten a time in which the autonomous moving object 100 stays on the crosswalk 200 while avoiding the obstacles, it is possible to cross the crosswalk safely and quickly. Here, as described above, since the cameras 134 and the laser distance sensors 136 are included on the front and rear sides of the autonomous moving object 100, it is possible to observe the obstacles in the front and the rear of the autonomous moving object 100. Since the self-position can be known by the self-position estimation unit 114, T1 and T2 can be normally calculated and compared.

In this way, in a case in which the signal state is changed from blue to red after a predetermined time on the crosswalk (for example, blue is blinking) or a case in which the signal state is changed from blue to red, the traveling route decision unit 118 calculates a first time necessary to move a first route from the self-position to the end point of the crosswalk and a second time necessary to move a second route from the self-position to the start point of the crosswalk and selects a route corresponding to the smaller time between the first time and the second time.

As described above, according to the embodiment, the autonomous moving object can cross the crosswalk safely and quickly.

(Second Embodiment)

Next, a configuration and an operation of an autonomous moving object 100 according to the second embodiment of the invention will be described with reference to FIGS. 5 to 8. In the embodiment, an operation of the autonomous moving object 100 in a case in which an obstacle is present on a crosswalk will be described. The configuration of the autonomous moving object 100 used in the embodiment is the same as that of the first embodiment, but functions are different. The details of the functions will be described below.

Figure 5:
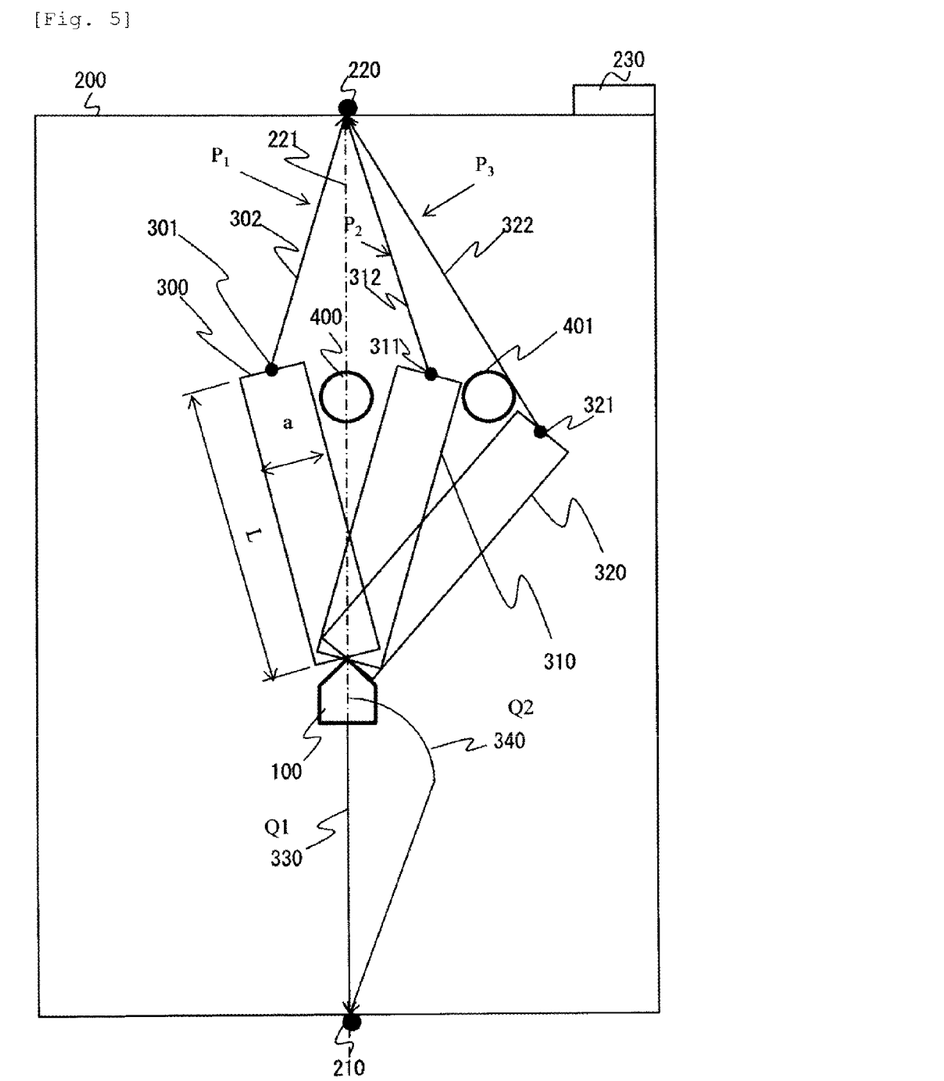
FIG. 5 is a conceptual diagram illustrating route candidate searching executed by the autonomous moving object according to a second embodiment of the invention.

FIG. 5 is a conceptual diagram illustrating route candidate searching executed by the autonomous moving object 100 according to the second embodiment of the invention. Specifically, FIG. 5 illustrates a concept of the route candidate searching when a blue signal is blinking or is changed to red on a crosswalk on which an obstacle is present. The autonomous moving object 100 (the obstacle detection unit 116) determines the size, location, and speed of the obstacle and whether the obstacle is a person or an object based on information from the sensor 132 such as the camera 134 or the laser distance sensor 136 mounted on the autonomous moving object 100.

For example, searching of an obstacle avoidance route in a case in which the obstacle detection unit 116 detects two obstacles 400 and 401 and a method of deciding a route by the traveling route decision unit 118 will be described.

The autonomous moving object 100 obtains rectangles 300, 310, and 320 at a passable distance by rotating the rectangle 300 which has a length L and a width a and is at the passable distance at predetermined angles about the autonomous moving object 100 so that the rectangles do not come into contact with the obstacles detected by the sensor 132. Here, the length L indicates a traveling distance of the autonomous moving object 100 and the width a is assumed to be a value obtained by adding a safety distance to the obstacle to the width of the autonomous moving object 100.

In order for the autonomous moving object 100 to avoid the touch with the obstacles and ensure safety, the value a may be set to be large. When a speed of the autonomous moving object 100 or relative speeds to the obstacles are large, the width a is preferably set to be large. For example, the width a is assumed to be a distance according to the speed of the autonomous moving object 100 or the relative speeds to the obstacles. Further, the length L is assumed to be a length according to the speed of the autonomous moving object 100 or the relative speeds to the obstacles.

As illustrated in FIG. 5, the rectangle 300 at the passable distance is formed to the left of the obstacle 400 to avoid the obstacle 400. The rectangle 310 is formed between two obstacles, the obstacles 400 and 401. The rectangle 320 at the passable distance is formed to the right of the obstacle 401 to avoid the obstacle 401. The rectangles (that is, route candidates) at the passable distances are preferably close to a route 221 connecting the standard route points 210 and 220 in a straight line since distances away from the standard route points are shorter.

Obstacles avoidance targets 301, 311, 321 are formed in the middles (that is, at the positions of 1/2a) at the front ends of the rectangles in the width direction. Lines connecting these target points and the end point (the standard route point 220) of the crosswalk 200 are set as traveling route candidates.

Specifically, a route 302 connecting the obstacle avoidance target 301 of the rectangle 300 at the travelable distance and the end points 220 from the current position of the autonomous moving object 100 is assumed to be a forward movement route candidate P1. Similarly, P2 and P3 are generated as route candidates for avoiding the obstacles. P2 is assumed to be a route connecting the obstacle avoidance target 311 and the endpoint 220 from the current position. P3 is assumed to be a route connecting the obstacle avoidance target 321 and the end point 220 from the current position.

Figure 6:
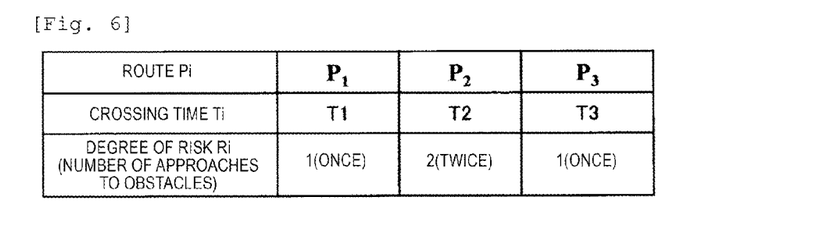
FIG. 6 is a diagram illustrating a correspondence relation among various parameters (at forward movement time) used by the autonomous moving object according to the second embodiment of the invention.

FIG. 6 is a diagram illustrating a correspondence relation among various parameters (at forward movement time) used by the autonomous moving object 100 according to the second embodiment of the invention. Specifically, FIG. 6 illustrates a correspondence relation among a route length Pi, a crossing time Ti taken to cross each route, and the degree of risk Ri (where i=1, 2, and 3) for each route.

Here, for example, the number of approaches to an obstacle is set to the degree of risk R. That is, the degree of risk indicates easiness of touch between a detected obstacle and the autonomous moving object 100. In this case, as the number of approaches to the obstacle is larger, the degree of risk R increases. Specifically, since the number of approaches to the object merely one for P1 and P3, the autonomous moving object 100 evaluates (counts) the degree of risk R to 1. For P2, the degree of risk R is 2 because of approach to both of the route candidates, that is, two-time approach.

In the embodiment, for example, the degree of risk R is evaluated as the number of approaches. However, a method of weighting the degree of risk depending on whether an obstacle is a person or an object (a bicycle or the like) or whether an obstacle is a stationary object or a moving obstacle may be used. In a case in which the obstacle is a moving obstacle, a method of weighting the degree of risk depending on a relative speed of the autonomous moving object 100 to the obstacle may be used. Optimum factors (causes) used to determine (weight) the degree of risk R may be selected appropriately according to situations.

Incidentally, a method of generating route candidates in a case of backward movement (retreat) as well as the forward movement is also illustrated in FIG. 5. Hereinafter, an example of a case in which no object is present on the rear side will be described. Here, an obstacle on the rear side is detected by the sensor 132 mounted on the rear side of the autonomous moving object 100.

Specifically, a route 330 in a case in which the autonomous moving object 100 retreats directly without changing the direction and returns back to the standard route point 210 which is the start point of the crosswalk 200 is set to a route Q1, and a route 340 in which the autonomous moving object 100 changes the direction and returns back to the start point 210 is set to a route Q2. Here, since no obstacle is present, it is not necessary to avoid an obstacle. Therefore, the routes Q1 and Q2 are routes in which the autonomous moving object 100 returns to the start point 210 at the shortest distance.

Figure 7:
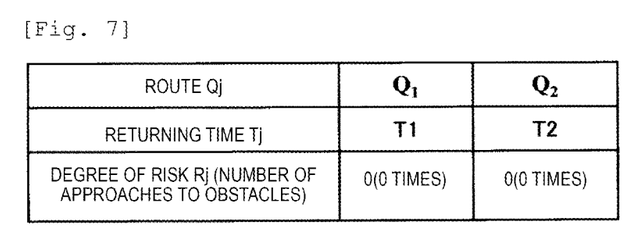
FIG. 7 is a diagram illustrating a correspondence relation among various parameters (at backward movement time) used by the autonomous moving object according to the second embodiment of the invention.

In the two routes, a returning time Tj and the degree of risk Rj are illustrated in FIG. 7 (where j=1 and 2). FIG. 7 is a diagram illustrating a correspondence relation among various parameters (at backward movement time) used by the autonomous moving object according to the second embodiment of the invention. Since no obstacle is present on the rear side of the autonomous moving object 100, the degree of risk R is 0 in both of the routes.

Figure 8:
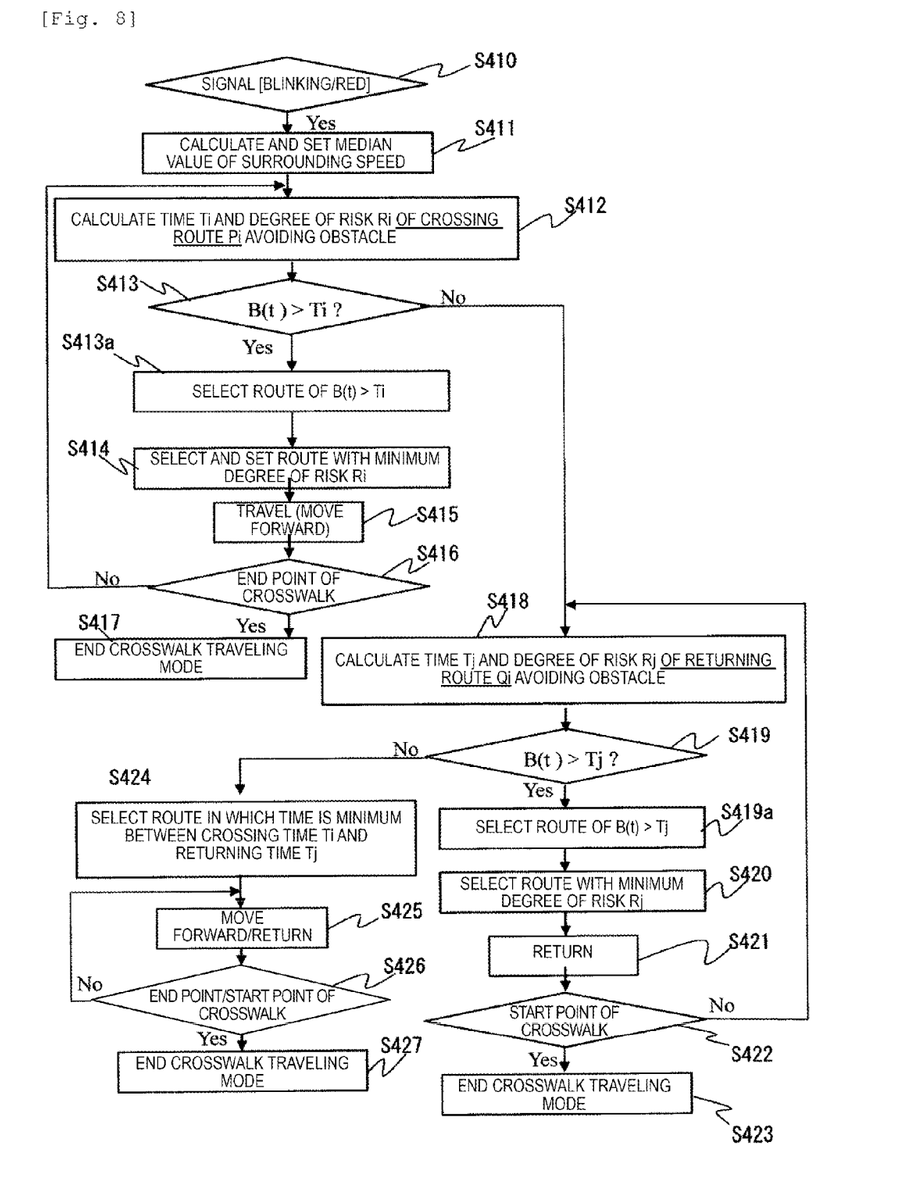
FIG. 8 is a flowchart illustrating a process for a crosswalk traveling mode performed by the autonomous moving object according to the second embodiment of the invention.

Which route is selected among the three route candidates P1, P2, and P3 on the front side and the two route candidates Q1 and Q2 on the rear side formed in this way is decided by an algorithm illustrated in FIG. 8. FIG. 8 is a flowchart illustrating a process for a crosswalk traveling mode performed by the autonomous moving object 100 according to the second embodiment of the invention.

When a signal is blinking or is changed to red during crossing (S410), the speed decision unit 120 and the obstacle detection unit 116 in the autonomous moving object 100 first cooperate to calculate and set a median value of speeds of surrounding obstacles in a case in which the moving obstacles are present around (S411). On a crosswalk, for example, peoples and bicycles come and go as obstacles. In general, the number of peoples is larger than the number of bicycles. By using a median value, it is possible to exclude an influence of a speed of a bicycle with a small detection probability on a speed (representative value) of a surrounding obstacle.

In a case in which no obstacle is present around, the autonomous moving object 100 sets a cruising speed (normal movement speed) of the autonomous moving object 100 or a speed greater than the cruising speed.

As described with reference to FIGS. 5 and 6, the autonomous moving object 100 calculates the time Ti and the degree of risk Ri of the route Pi in a case in which the autonomous moving object 100 finishes crossing the crosswalk (S412). Next, the autonomous moving object 100 compares the time Ti (where i=1, 2, and 3) necessary for each route illustrated in FIG. 6 to the blinking time B(t) of the signal (S413) and selects a route Pi in which the time is shorter than the blinking time B(t) of the signal (S413a). In a case in which Ti is less than B(t), the autonomous moving object 100 can determine that the autonomous moving object 100 finishes crossing the crosswalk while the signal is blinking. Then, the autonomous moving object 100 selects a route with the smallest degree of risk R among the routes Pi satisfying this condition as the route (S414).

That is, the traveling route decision unit 118 calculates the degree of risk indicating the easiness of touch between the detected obstacle and the autonomous moving object 100 and selects the route in which the calculated degree of risk is smallest.

Here, for example, in a case in which $B(t) > T1$, $B(t) > T2$, and $B(t) < T3$, the degrees of risk R of the routes P1 and P2 illustrated in FIG. 6 are compared, the route P1 with the smaller degree of risk R is selected, and the autonomous moving object 100 continues crossing through forward movement traveling (S415) until the crossing of the crosswalk is finished (S416). Therefore, the routes in FIG. 5 and T and R in FIG. 6 are updated every moment depending on situations of the obstacles.

B(t) also decreases over time t from start of the blinking. Therefore, B(t) similarly is expressed by a function (formula) of time t. The signal blinking time B(t) may be stored in advance in the stored information processing unit 110 for each crosswalk (for each traffic light).

Next, in a case in which the autonomous moving object 100 may not reach the end point 220 within a time of B(t) by moving forward (No in S413), the autonomous moving object 100 calculates the time Tj and the degree of risk Rj of the route Qj in a case in which the autonomous moving object 100 returns back avoiding the obstacle (S418). Here, no obstacle is present in this case. Therefore, the route Qj is generated and the time Tj and the degree of risk Rj are calculated, as illustrated in FIGS. 5 to 7.

Next, the autonomous moving object 100 compares the time Tj (where j=1 and 2) necessary for each route Qj illustrated in FIG. 7 to the signal blinking time B(t) (S419) and selects a route in which the time is shorter than the signal blinking time B (t) (S419*a*).

The autonomous moving object 100 selects the route with the smallest degree of risk R among the routes Qj satisfying this condition (S420). The autonomous moving object 100 moves backward and returns back the crosswalk up to the endpoint of the crosswalk.

That is, of the times T and the degrees of risk R illustrated in FIG. 7, the route in which the autonomous moving object 100 returns back to the start point (the standard route point 210) of the crosswalk within the blinking time B(t) (S419) and the degree of risk R is the smallest is decided (S420).

In a case in which the autonomous moving object 100 retreats and returns back to the start point of the crosswalk and an obstacle is present, the autonomous moving object 100 may calculate the route, the time T, and the degree of risk R in the same order as the above-described order of the forward movement and select the route.

Next, in a case in which the autonomous moving object 100 may not finish crossing the crosswalk within the signal blinking time B(t) even in either the forward movement or the retreat and may not return back (No in S413 and No in S419), the autonomous moving object 100 selects the route P or Q corresponding to the shortest time among the crossing times Ti illustrated in FIG. 6 and the returning times Tj illustrated in FIG. 7 (S424). When the crossing time Ti is the minimum, the autonomous moving object 100 moves forward. When the returning time Tj is the minimum, the autonomous moving object 100 returns back. Accordingly, since a staying time on the crosswalk 200 can be set to be the shortest, a risk exposure time is small and safety can be improved.

In this way, in a case in which the signal state indicates that the signal is changed from blue to red after the predetermined time on the crosswalk (for example, blue is blinking), the traveling route decision unit 118 selects the route in which the autonomous moving object 100 can arrive at the start point or the end point of the crosswalk within a time in which the signal state is changed to red.

As described above, according to the embodiment, the autonomous moving object can cross the crosswalk safely and quickly.

(Third Embodiment)

Figure 9:
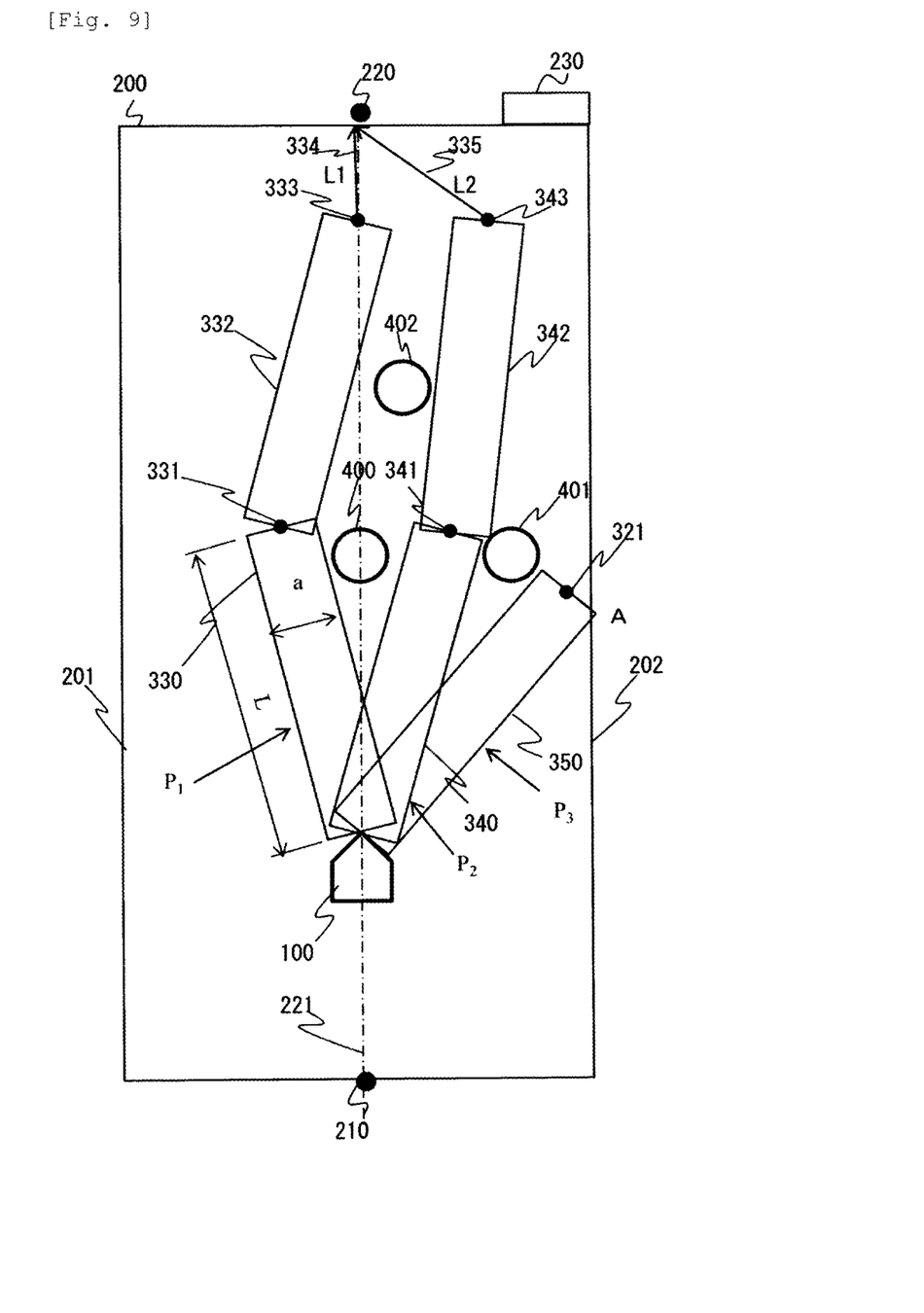
FIG. 9 is a conceptual diagram illustrating route candidate searching executed by the autonomous moving object according to a third embodiment of the invention.

Next, the configuration and an operation of an autonomous moving object 100 according to a third embodiment of the invention will be described with reference to FIGS. 9 and 10. FIG. 9 is a conceptual diagram illustrating route candidate searching executed by the autonomous moving object according to the third embodiment of the invention.

FIG. 9 illustrates generation of route candidates in a case in which the autonomous moving object 100 is traveling on a straight route 221 connecting a standard route point 210 which is a start point of a crosswalk to a standard route point 220 which is an end point of the crosswalk and detects three obstacles 400, 401, and 402 in a traveling direction.

When crossing times Ti and the degrees of risk Ri of the route candidates are decided (can be evaluated), the route may be selected in accordance with the method described with reference to FIG. 8 in the second embodiment. Therefore, generation of route candidates and an evaluation method for the degree of risk will be described herein.

Differences between the embodiment and the second embodiment are that the number of obstacles is two and the obstacles are present in the width direction of the crosswalk in the second embodiment, but a new obstacle 402 is detected on the rear side of the obstacle 400 in the embodiment. Further, the road width of the crosswalk 200 is narrow and an end A of a rectangle 350 at a passable distance goes over the right end 202 of the crosswalk 200 (including a case in which the end A is on the right end 202) along a route P3 detouring to the right side of the obstacle 401.

More specifically, the laser distance sensor 136 emits a laser beam from the sensor, receives the laser beam reflected from an obstacle, and detects the obstacle. Therefore, since the laser beam is blocked by the obstacle 400 immediately before the sensor 136, it is difficult to detect the obstacle 402 on the back (rear) of the obstacle 400.

In the embodiment, however, the camera 134 mounted on the upper portion of the autonomous moving object 100 can overlook obstacles, and thus can capture the obstacle 402. The camera 134 can detect the obstacles from the autonomous moving object 100 to the end point (standard route point 220) of the crosswalk.

Next, a method of generating route candidates at the end point of the crosswalk avoiding the obstacles detected in this way will be described.

In the embodiment, as described in the second embodiment, a rectangle 330 at a travel distance is rotated about the autonomous moving object 100 at predetermined angles to seek routes in which there is no touch to the obstacles. FIG. 9 illustrates an example in which three rectangles 330, 340, and 350 are sought as first rectangles in travelable distances.

A route candidate generated from the rectangle 330 is assumed to be P1, a route candidate formed from the rectangle 340 is assumed to be P2, and a route candidate formed from the route 350 is assumed to be P3. Here, in P3, the end A of the rectangle 350 at the travelable distance goes over the right end 202 of the crosswalk. This means that the autonomous moving object 100 is outside from the width of the crosswalk 200. Therefore, the autonomous moving object 100 determines that this route is risky and excludes P3 from the route candidates.

The autonomous moving object 100 rotates a rectangle 332 at the travelable distance using an obstacle avoidance target 331 as a rotation center at a predetermined angle and selects the route candidate P1 so that an obstacle avoidance target 333 formed at the front end of the rectangle 332 is closest to the line of the straight line 221 connecting the standard route point 210 and the standard route point 220. Here, the obstacle avoidance targets 331 and 333 are formed in the middles of front ends of the rectangles 330 and 332 at the travelable distance in the width direction.

Here, since no obstacle is present, the obstacle avoidance target 333 overlaps the straight line 221. A straight line L1 connecting the obstacle avoidance target 333 to the standard route point 220 is assumed to be a route of P1. That is, the route length of P1 is obtained by adding the length 2L of the two rectangles to the above-described L1. Since the route of P1 is close to two obstacles, the degree of risk is 2 when the number of approaches is regarded as the degree of risk.

Similarly, the autonomous moving object 100 generates the route candidate P2. In P2, the obstacle 402 is present on the rear of the rectangle 340 at the travelable distance. Therefore, even when a rectangle 342 at a travelable distance is rotated about an obstacle avoidance target 341, the obstacle avoidance target formed at the front end of the rectangle 343 may not overlap on the straight line 221 connecting the above-described standard route points.

Therefore, a distance L2 from the obstacle avoidance target 343 to the standard route point 220 is longer than L1 of the route P1. The degree of risk is 3 since the autonomous moving object approaches the obstacles three times.

Figure 10:
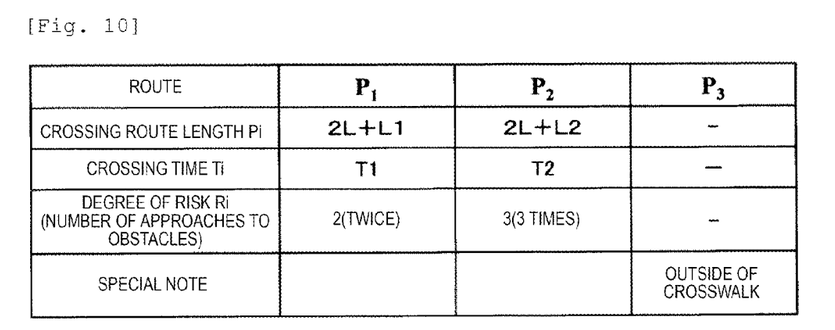
FIG. 10 is a diagram illustrating a correspondence relation among various parameters used by an autonomous moving object according to the third embodiment of the invention.

FIG. 10 diagram illustrating a correspondence relation among various parameters used by an autonomous moving object 100 according to the third embodiment of the invention. Specifically, FIG. 10 illustrates a correspondence relation among a route length, a time taken to cross each route, the degree of risk, and a special note for each route.

As illustrated in FIG. 10, a crossing route length of the route P1 is 2L+L1 and a route length of the route P2 is 2L+L2. As each crossing time Ti, T1 and T2 are calculated from the speed of the autonomous moving object 100. Here, since L2 is longer than L1, T2 is greater than T1. The degrees of risk R1 and R2 are 2 and 3 from the number of approaches to the obstacles. That is, the degree of risk R in P2 is greater than in P1.

Here, as described above, the degree of risk may be weighted according to the kinds of obstacles (people and objects) and motion states (stop and movement) of the obstacles. When the obstacle is a moving obstacle, the degree of risk may be weighted according to the magnitude of a relative speed of the autonomous moving object 100 to the moving obstacle, the size of the width a, and the like.

The autonomous moving object 100 decides the movement route based on the crossing time Ti and the degree of risk Ri of each route according to the algorithm illustrated in FIG. 8 in the second embodiment. Accordingly, in the embodiment, the autonomous moving object 100 can cross the crosswalk safely and quickly as in the second embodiment.

In the embodiment, the traveling route decision unit 118 selects the route which does not go over the crosswalk and the route closest to the straight line connecting the start point and the end point of the crosswalk.

As described above, according to the embodiment, the autonomous moving object can cross the crosswalk safely and quickly.

The invention is not limited to the foregoing embodiments, but includes various modification examples. The foregoing embodiments have been described to easily understand the invention, and the invention is not limited to inclusion of all of the described configurations. Some of the configurations of a certain embodiment may be substituted with configurations of another embodiment and configurations of another embodiment may be added to configurations of a certain embodiment. Other configurations may be added to, deleted from, or substituted with some of the configurations of each embodiment.

In the forgoing embodiments, the autonomous moving object 100 moves using four wheels, but any number of wheels can be used. The autonomous moving object 100 may move using any mechanism such as a leg mechanism.

In the foregoing embodiments, the positional information regarding the start point and the end points of the crosswalk is stored in advance in the stored information processing unit 110. However, a transmitter may be installed in a traffic light of a crosswalk and the autonomous moving object 100 may receive a signal and determine a start point and an end point. A coating material applied to a road surface and indicating a crosswalk may be recognized with a camera or the like to determine a start point and an end point.

REFERENCE SIGNS LIST

100 autonomous moving object
110 stored information processing unit
112 environment information acquisition unit
114 self-position estimation unit
116 obstacle detection unit
118 traveling route decision unit
120 speed decision unit
122 vehicle control unit
130 input and output unit
132 sensor
134 camera
136 laser distance sensor
200 crosswalk
210 standard route point (start point of crosswalk)
220 standard route point (end point of crosswalk)
230 traffic light
300, 310, 320 passable distance rectangle
301, 311, 321 obstacle avoidance target
400, 401 obstacle

The invention claimed is:

1. An autonomous moving object comprising:
an imager that acquires a signal state of a traffic light;
an information memory that stores blinking times of the traffic lights;
a first plurality of sensors that determine a self-position of the autonomous moving object;
a second plurality of sensors that detect obstacles along a particular path of the autonomous moving object, and
a motor controller that controls movement including a speed of the autonomous moving object,
wherein the autonomous moving object, in response to the imager detecting that the signal state of the traffic light has changed from a GO signal to a blinking signal for a crosswalk:
approximates an amount of time remaining prior the blinking signal changing to a stop signal based on the blinking times stored in information memory,
determines a plurality of potential first paths, wherein each of the plurality of potential first paths move the autonomous moving object from the self-position to an end point of the crosswalk,
calculates first travel times for the autonomous moving object to traverse the plurality of potential first paths based on a distance of the first paths and the each speed of the autonomous moving object,
calculates a first risk for each particular potential first path from the plurality of potential first paths based on a number of obstacles detected by the second plurality of sensors along each particular first path,
determines a subset of the plurality of potential first paths that have the first travel times that are less than the amount of time remaining prior the blinking signal changing to the stop signal,
on a condition that the subset of the plurality potential first paths contains at least one path, selects a selected route from the subset of the plurality potential first paths where the first risk of the particular first path is minimized, and
moves along the selected route with the speed based on speeds of surrounding moving obstacles detected by the second plurality of sensors and/or faster than the speed before changing to the blinking signal.

2. The autonomous moving object according to claim 1, wherein on a condition that the subset of the plurality potential first paths do not contain at least one path, the autonomous moving object:
determines a plurality of potential second paths, wherein each of the plurality of potential second paths move the autonomous moving object from the self-position to a start point of the crosswalk, calculates second travel times for the autonomous moving object to traverse the plurality of potential second paths based on a distance of the first paths and the each speed of the autonomous moving object, calculates a second risk for each particular potential second path from the plurality of potential second paths based on a number of obstacles detected by the second plurality of sensors along each particular second path, determines a second subset of the plurality of potential second paths that have second travel times that are less than the amount of time remaining prior the blinking signal changing to the stop signal, on a condition that the second subset of the plurality potential second paths contains at least one path, selects the selected route from the second subset of the plurality potential second paths where the second risk of the particular second path is minimized.

3. The autonomous moving object according to claim 2, wherein:

each of the plurality of potential second paths includes the travel speed of the autonomous moving object, and the second risk for each particular potential second path from the plurality of potential second paths is weighted based on the travel speed of the particular potential second path and relative speeds of obstacles detected by the second plurality of sensors along each particular second path.

4. The autonomous moving object according to claim 1, wherein:

each of the plurality of potential first paths includes the travel speed of the autonomous moving object, and the first risk for each particular potential first path from the plurality of potential first paths is weighted based on the travel speed of the particular potential first path and relative speeds of obstacles detected by the second plurality of sensors along each particular first path.

5. The autonomous moving object according to claim 1, wherein the first risk indicates a likelihood of a touch between the obstacles detected by the second plurality of sensors and the autonomous moving object and weighted according to kinds of obstacles or motion states.

6. The autonomous moving object according to claim 1, wherein the first risk is determined based on a number of approaches to the obstacles detected by the second plurality of sensors and weighted according to safety distances to the obstacles.

7. The autonomous moving object according to claim 1, wherein the autonomous moving object further:

removes from the subset of the plurality of potential first paths any path that is outside of the crosswalk.

* * * * *